Patented July 20, 1937

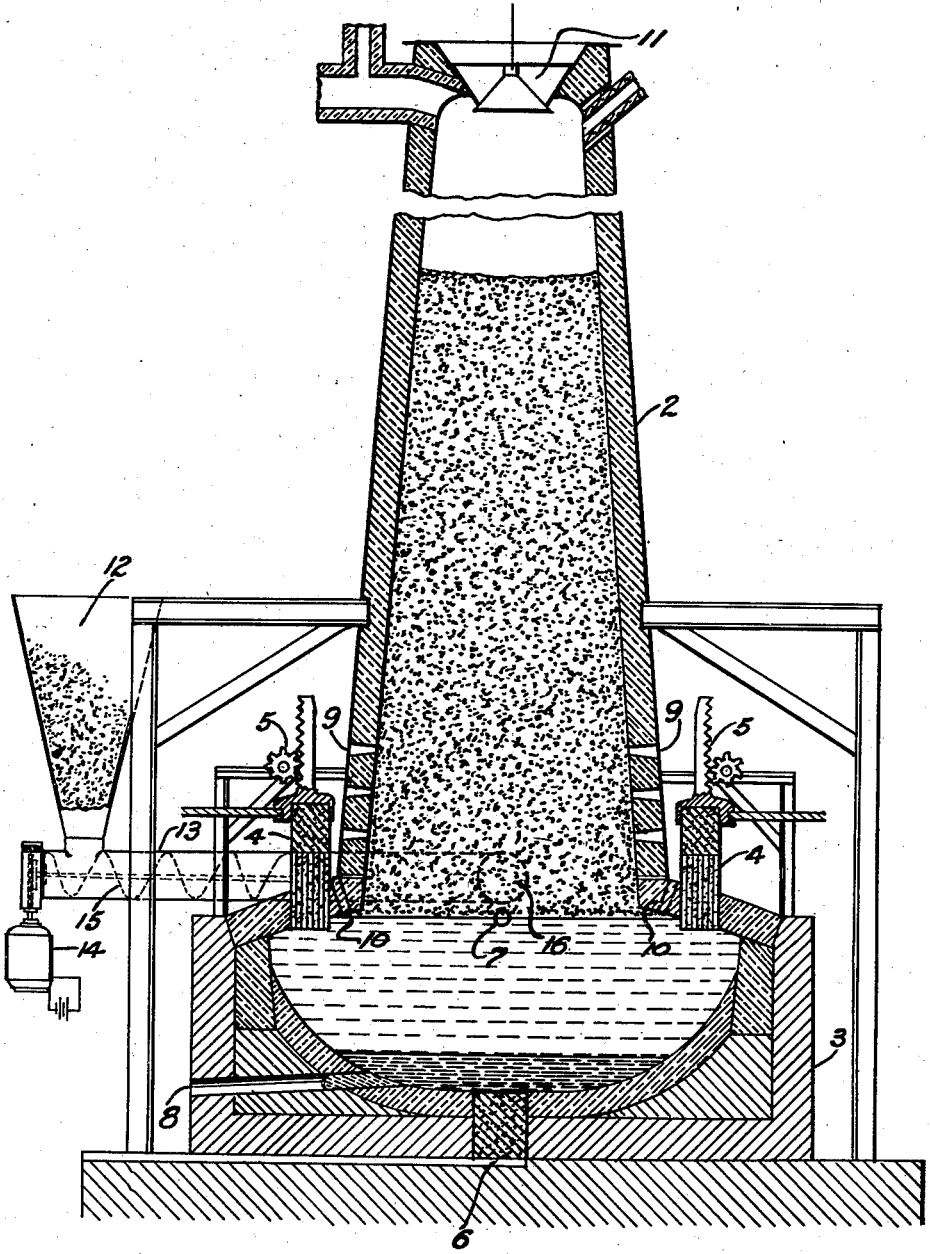

2,087,272

UNITED STATES PATENT OFFICE 2,087,272

METHOD OF REDUCING ORES

Raymond S. Wile, Flushing, N. Y., assignor to Electric Smelters, Inc., Dover, Del., a corporation of Delaware Application June 10, 1933, Serial No. 675,189

4 Claims. (Cl. 75—10)

This invention relates in general to the reduction of ore, drosses and the like, to provide an economical and efficient method for the recovery of metalliferous substances from ores, whereby they may be reduced to mattes, metals or other elements or compounds.

In my prior Patents Nos. 1,111,050 and 1,111,341, there are disclosed apparatus and methods respectively, wherein ores may be reduced to recover metalliferous substances involving, generally, the principle of utilizing slag as a resistor in an electrical furnace. These methods and apparatus are superior to electric furnaces using the arc principle, in that a more uniform distribution of heat is achieved, and have other advantages inherent in my prior mentioned patents.

While the methods and apparatus of my prior patents have distinct advantages over electric furnaces utilizing the arc principle, or over blast furnaces in which fuel is consumed to provide the requisite heat for smelting of the ores, economical considerations in the operation of the slag resistor type of electric furnaces require consideration of the current consumption where raw materials such as the slag components are easily obtained, or in more difficultly accessible localities where current rates may be lower, require the consideration of the cost of slag materials where it is difficult to obtain these ingredients.

Furthermore, without conditions of operation being taken into consideration as to the heat generated in the furnace and its relation to the condition of the slag and its composition, there have resulted further losses including that by reason of the entrainment of the desired metalliferous material in the slag that is formed; that due to the chemical reactivity of the compounds of the metallic values desired to be recovered with the slag; that due to the volatility of the metals desired to be separated where undue temperatures prevail in the furnace and that by reason of the condition which may be involved due to overheating the furnace, resulting in boiling of the slag and inability to segregate the metalliferous material from the slag.

I have found that the reduction of ores to separate metallic values, mattes or the like in accordance with the method and apparatus referred to in my prior patents, may be operated with considerable economy not only from the standpoint of current consumption and utilization of the ingredients entering into the batch, but also by avoiding losses in the material to be recovered, which is accomplished by a novel control of the composition forming the slag resistor during the operation of the furnace.

My invention is premised upon a determination of the temperature of chemical combination of the compounds of the metallic values desired to be recovered in the ore and the components of the slag as occurring under operating condition which is substantially critical to the economical recovery of metallic values, mattes or the like or compounds, and upon a determination that certain metal compounds and slag compositions have more or less constant temperatures of chemical combination which, if avoided by operating temperatures in excess of the same, will prevent losses such as having the slag carry from the ore the valuable metalliferous substances. Operation at a temperature critical to the dissociation of the compounds of the metal and the slag, or operation at the temperature above that which may be considered as the critical temperature of dissociation, while retaining the slag in a fluid or fused condition, has been determined to be the most economical mode of operation, and such conditions of operation not only effect economies in this direction, but also effect a more efficient separation of the metalliferous substances from the slag.

There is some leeway permitted in operation. If power costs are low, and certain slag materials are scarce, higher critical temperature slags may be used by employment of more power, thereby arriving at the same economical result as if normal slag compositions were employed. Conversely, if power costs are very high and there is an abundance of slag forming materials, slags with lower critical dissociation points may be used, and in that manner arrive at a reasonable economic and metallurgical result.

My invention therefore has for an object thereof, not only the provision of a novel method of operation of an electrical furnace of the resistor type, but also the method of preparing a batch for such type of electrical furnace whereby the economies heretofore mentioned may be achieved.

In the practice of my invention in the reduction of any ore, preliminary inspection is made of the ore or ore concentrate and the slag materials by laboratory tests to determine the critical dissociation temperature of the compounds of the metallic values to be recovered and the slag making components. Having ascertained this temperature, sufficient fluxing materials are added to result in a substantial fluid slag at the ascertained temperature corresponding to the critical temperature of dissociation or decomposition of the metalliferous substance and the slag. This batch when introduced into the slag resistor type of electric furnace, as set forth in my prior patents, will result in the economies heretofore mentioned, to wit, a separation of the metalliferous materials without entrainment of the metalliferous substance in the slag due to an improper fluidity of the slag and without loss of the compounds of the metalliferous values which may enter into combination with the slag. This will further effect substantial economy in the electrical current necessary for operating the furnace by reason of the fact that the addition of the fluxing ingredients permits a maintenance of a minimum temperature for the reaction while achieving fluidity of the slag from which the metalliferous substance is liberated.

In operation, sufficient current is passed through the slag to maintain at least the critical temperature of dissociation as previously determined for the particular ore or ore concentrate, while maintaining the slag in a state of fluidity.

As an example of a mode of operation in accordance with my method, for the recovery of tin from a tin ore concentrate containing cassiterite or tin oxide, the following procedure is illustrative:—

*Concentrate analysis*

| | Percent |
|---|---|
| Tin (tin oxides 79.50%) | 62.60 |
| Silica and alumina | 2.75 |
| Iron oxide | 10.92 |
| Magnesia and lime | 1.06 |
| Arsenic | 0.14 |
| Antimony | 1.30 |

Specimens of this concentrate were heated with silica and a carbon reducing agent and the critical temperature of dissociation or the temperature at which chemical combination of the tin oxide and the components of the slag was prevented, was determined to be 1450 degrees C. While silicious slags are fluid at about 1100 degrees C., the furnace is operated at at least the critical temperature of dissociation of silica and the metalliferous substance, or at the temperature which when reached or exceeded will prevent the chemical combination of the metalliferous materials and the components of the slag, as above determined, and retain the slag in fluid condition. If the carbon reducing agent were not added and the batch was brought to the critical temperature of dissociation, the tin oxide would not be reduced nor would it enter the slag as a component of any of the slag forming materials. This mode of operation results in the separation of the metallic values, that is, tin in the metallic form, with practically no loss of tin held mechanically as such or chemically as tin compounds in the slag. The slag analysis after operation, in accordance with the above procedure is as follows:—

| | Percent |
|---|---|
| Tin oxide | 00.32 |
| Silica and alumina | 68.02 |
| Iron oxide | 21.48 |
| Magnesia | 4.18 |
| Lime | 6.00 |
| Arsenic | None |
| Antimony | None |

The distinguishing feature in the preparation of a batch and the operation as above described, as compared with a blast or reverberatory type of furnace is that it avoids the necessity for adding large quantities of lime and makes possible the addition of silica to the extent of from 60 to 70% higher than that which would be possible in a blast or reverberatory type of furnace where the allowable percentage limit is about 38% silica. The modification of the furnace batch and the operation in accordance with the conditions outlined not only effects this economy in the choice of available materials, but also in a resultant separation of the desirable metalliferous substance without loss in the slag.

For purposes of illustrating another method of preparing a batch in accordance with my process and the mode of operation heretofore described, the following is given as an example for treating a lead, silver ore. Two classes of such ores were available, as follows:—

| | No. 1 ore | No. 2 ore |
|---|---|---|
| Lead (orig. assay) | 2.9% | 45.3% |
| Silver | 46.2 oz. | 15.1 oz. |
| Gold | .02 oz. | .06 oz. |
| Silica and alumina | 65.4% | 8.1% |
| Lime | 4.4% | None |
| Iron | None | 8.0% |

These two ores were mixed as follows:—

| | Pounds |
|---|---|
| No. 1 ore | 500 |
| No. 2 ore | 100 |
| Iron ore flux carrying 55% metallic iron | 231 |

165 pounds of lime with a 95.00% content of CaO. This gave a slag as follows:—

| | Percent |
|---|---|
| Silica | 49.20 |
| Iron oxide | 24.53 |
| Lime | 26.27 |

As in the previous example by preliminary test it was determined that the critical temperature of dissociation or the temperature at which the lead, silver or gold would not enter the slag was about 1220 degrees C. The operation of the slag resistor furnace at a temperature of 1220 degrees C. which requires about 298 kilowatt hours per ton to maintain it, resulted in a slag which shows no trace of lead, silver or gold, either chemically combined or mechanically retained. The products thus obtained are a lead bullion containing gold and silver, and a slag of no commercial value.

It is not always necessary to modify typical blast or reverberatory charges, for successful treatment by my method, the only requirement being necessary in these instances, is to predetermine the critical temperature of dissociation between the slag and the compounds of the metals to be recovered, and to operate the furnace at a temperature not below this temperature.

As an example of a typical copper charge or batch for a blast or reverberatory furnace, the following may be given.

| Ore | | Slag formers | |
|---|---|---|---|
| Copper | percent 10.20 | Silica percent | 24.40 |
| Silica | do 23.40 | Alumina do | 2.15 |
| Lime | do 21.55 | Iron oxide do | 38.55 |
| Iron | do 30.12 | Lime and magnesia, percent | 23.63 |
| Silver | ounces 2.65 | | |
| Gold | do 1.92 | | |
| Sulphur | percent 6.70 | | |
| Magnesia | do 2.08 | | |
| Alumina | do 3.15 | | |
| Moisture | do 2.80 | | |

This charge was preliminarily heated in a laboratory furnace and with each increment of 50° F. above red heat, specimens of the batch were analyzed until it was determined that the metal found most economical to recover, to wit, the copper component, showed that it did not enter into chemical combination with the slag forming material, of which iron oxide, lime and silica may be enumerated. It was determined that a temperature of 1050° C. was the critical temperature of dissociation. By this same method, it was determined that the temperature of 1050° C. would serve to avoid chemical reaction of the silver and gold components with the slag forming materials. When this batch was melted in the slag resistor furnace, the current was maintained to hold the temperature of the bath at 1100° C. as the minimum and without causing boiling of the slag forming materials. By this mode of operation, the resulting slag showed a content of 0.25% copper as compared with 2.37% in the slag resulting from operation of the batch in a reverberatory or blast furnace.

In the operation of my method and the maintenance of the requisite temperature, due allowance is made for the provision of sufficient resistance to the passage of current for the maintenance of such temperature, and for this purpose it is desirable to create a slag bath of sufficient resistance to the current to generate the required temperature efficiently and economically. This may be accomplished by adding a preponderance of lime or silica to the batch without changing the critical temperature of dissociation if these were the slag forming materials originally in the batch.

In the operation of the furnace, I provide for maintenance of a uniform temperature and avoidance of the variations of the current supply to avoid losses which occur in the drop of the temperature due to concentration in the bath of materials which decrease the resistance of the bath. This I accomplish by occasional additions to the bath, of such materials which compensate for the reduction in resistance of the bath. This I may accomplish by occasionally adding quantities of materials which retain the resistance of the bath substantially constant and where the preponderating ingredient in the slag is of a siliceous nature, silica is added at occasional intervals to maintain a constant resistance slag bath.

Thus, while during the operation of the bath, temperature conditions may be maintained constant by varying the depth of material through which the electrical current must pass by manipulation of the electrodes, I find that a novel method of obtaining constant results during operation is by occasional addition of such materials, preferably silica, to the bath to keep the resistance of the bath constant, and I consider a novel feature of my invention to reside in the maintenance of a minimum temperature which is at least the critical temperature of dissociation of the metalliferous substances and slag by the mode of operation of my furnace which involves the maintenance of the resistance of the bath substantially constant, by the addition of materials, preferably silica, during the operation of the furnace to thereby obtain uniformity in results. This in effect is accomplished by compensation for the materials which accumulate in the bath tending to reduce the resistance of the bath, by additions of materials which increase the resistance of the bath. The additions may be intermittent or progressively uniformly made.

To carry out the invention an electric furnace is employed such as that disclosed in Letters Patent issued to me September 22, 1914, No. 1,111,050, but it is preferred to employ the construction of furnace shown in the accompanying drawing, which is a vertical section.

Referring more specifically to the drawing, it will be observed that 2 represents the shaft or stack portion of the furnace and 3 the crucible into which the charge descends from the stack. Three electrodes are shown, the upper two 4, 4 of which project in through holes in the roof of the crucible and may be adjusted by the rack and pinion mechanism shown at 5. The lower electrode 6 projects through the bottom of the crucible and contacts with the reduced material. Any number of electrodes may, of course, be used either in the top or bottom.

Different types of electric current may be employed. For example, in the form shown, a three phase current may be used, one phase being connected to each electrode; or a two phase current, each of the upper electrodes being connected to one phase, and the lower electrode to a common return conductor.

In the upper part of the crucible, near its connection with the shaft, is provided a slag outlet 7, and a tap hole 8 is provided for the reduced material from the bottom through the side of the crucible. Twyers 9 are provided in the bosh of the shaft through which air may be blown in if desired to burn the carbon-monoxide rising from the charge of the ore, coke or other fuel or flux. Vents 10 are also provided, as shown, in order to allow gases to escape that otherwise would not be able to pass through the charge.

It will be observed that the shaft 2 is uniformly conical, thereby presenting a surface of ore to the heating medium that is greater than if the design were otherwise. This is conducive to quicker reduction of the charge, prevents hanging and permits of the use of a shallower bath of slag.

In starting the furnace, the upper electrodes are first lowered until they contact with some conducting material in the bottom of the crucible, so that the current will flow and heat this material. The slag forming material is gradually filled in and the electrodes gradually raised until the crucible is practically full of molten slag bath. The charge in the stack descends into this bath, as reduction occurs, and the reduction continues through the stack and crucible. The molten reduced metal collects at the bottom of the crucible, where it is tapped off in the usual manner, the heat being obtained by the resistance of the current passing through the slag bath. As the slag increases, it is tapped off through the slag hole at the top of the crucible to keep the bath at a practically constant depth.

As the upper electrodes enter the crucible only a small distance, they are subjected to the gases to only a slight extent and to a minimum of time, as the gases are quickly exhausted through the vents. Hence their life is relatively long. The charge material descending into the bath does not contact with them, and hence there is no chemical action between the two and no pressure from the charge on the electrodes tending to break them.

Little manipulation of the electrodes is required as they will wear very slowly. The operation goes on continuously, the charge being supplied at the top of the stack and the reduced metal being tapped out at the bottom of the crucible.

I have previously referred to a mode of operation of my furnace, whereby uniformity of results may be obtained with the minimum amount of attention, by maintenance of a slag bath composition of uniform resistance which thereby facilitates maintenance of a uniform temperature in the furnace. The materials to maintain the constant resistance of the furnace by an occasional addition may be added through the bell or hopper 11. However, this added material will not become effective for varying the resistance of the bath until the batch in the stack 2 has been cleared. In order to facilitate the addition of this material, I have, as shown in the drawing, included means for occasionally or progressively adding the resistance modifying material for the slag bath. In the drawing, 12 comprises an auxiliary hopper, which feeds materials such as lime or silica into a pipe line 13. A motor 14 by worm and wheel connection drives a worm conveyor 15, the end of which terminates into a lateral opening 16 through the stack wall at a point just above the normal level of the slag bath. During operation, as observations of the temperature of the slag bath indicate a decrease in the resistance of the bath, the material from the auxiliary hopper 12 is fed to the furnace through the opening 16 to compensate for the reduction in resistance of the bath.

It will be observed that the intermittent or progressive additions of the resistance increasing material to maintain uniformity of results in the operation of the furnace may be made fairly automatic by an inter-relationship of the operation of the motor 14 to feed the materials from the auxiliary hopper 12 and the control means for the current supply of the furnace.

It will thus be observed that I have provided a novel method for economically recovering metalliferous substances permitting the recovery of desirable metalliferous substances or compounds at the point where the raw material is located, with minimum cost, and further, by the mode of operation as described, permitting the use of a large volume slag bath with a comparatively shallow depth. The constancy and uniformity of operation, as outlined by the features described, permit a rather shallow depth bath to be used, with narrow limits of tolerance in the size of the slag crucible of the furnace to take care of possible variations in operating conditions.

It will be understood that the apparatus may be varied widely without departing from the spirit of the invention, and that such variations are all contemplated and included within the scope of the appended claims.

Having thus described my invention and illustrated its use, what I claim as new and desire to secure by Letters Patent, is—

1. The method of reducing ores which comprises forming a slag resistor bath, maintaining said bath at approximately constant depth by draining off excessive amounts, passing an electrical current therethrough between electrodes and feeding an ore charge into the bath and out of contact with the electrodes, and maintaining a substantially constant electrical resistivity of the bath by separate additions of materials which compensate for the variation in resistance of the bath.

2. In the method of reducing metalliferous bodies which includes the use of a slag resistor as a medium of separation of the metal from a batch containing metalliferous substances, reducing agent and slag formers, by filtration through the slag, the step or steps which include passing sufficient current through the slag resistor to maintain the slag at fluidity, and at least the critical temperature of dissociation of the metalliferous substances comprised in the batch and the slag, and maintaining substantially uniform temperatures of operation by intermittently increasing the resistance of the slag during operation.

3. In the method of reducing ore, dross or concentrates and the like, the steps which include providing a batch of ore, or ore concentrate, and slag material, predetermining the critical temperature at which the desired metalliferous values of the ore or concentrate dissociate from the slag formed by the slag forming constituents of the ore or ore concentrate, passing an electrical current through the batch so formed to maintain a resistor slag bath and maintaining the current through said bath to generate a temperature at least equivalent and sufficient to maintain the slag resistor in a state of fluidity, feeding raw ores and a reducing agent or agents to said bath while separating the metalliferous substances and excess slag, and feeding resistance increasing materials to the slag bath to keep said bath of substantially constant resistance.

4. The method of reducing ores which comprises forming a slag bath resistor by passing an electrical current through the ore batch, including a siliceous component, while the batch is maintained between electrodes, feeding an ore batch into the bath which is maintained at the predetermined critical dissociation temperature of the metal values contained in the ore and slag forming material and out of contact with the electrodes, and compensating for the decrease in resistance of the siliceous bath during operation to maintain a substantially constant electrical resistivity of the bath by the addition of siliceous material to the bath during operation.

RAYMOND S. WILE.